United States Patent
Guan

(10) Patent No.: US 11,881,614 B2
(45) Date of Patent: Jan. 23, 2024

(54) MOBILE TERMINAL AND ANTENNA RADIATION METHOD OF MOBILE TERMINAL

(71) Applicant: BEIJING XIAOMI MOBILE SOFTWARE CO., LTD., Beijing (CN)

(72) Inventor: Wenjie Guan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 600 days.

(21) Appl. No.: 16/681,783

(22) Filed: Nov. 12, 2019

(65) Prior Publication Data

US 2020/0343623 A1     Oct. 29, 2020

(30) Foreign Application Priority Data

Apr. 26, 2019   (CN) .......................... 201910343400.5

(51) Int. Cl.

| | |
|---|---|
| *H01Q 1/36* | (2006.01) |
| *H01Q 1/24* | (2006.01) |
| *H01Q 5/357* | (2015.01) |
| *H04M 1/02* | (2006.01) |

(52) U.S. Cl.
CPC ............. *H01Q 1/243* (2013.01); *H01Q 5/357* (2015.01); *H04M 1/0274* (2013.01)

(58) Field of Classification Search
CPC .......... H01Q 1/243; H01Q 5/357; H01Q 1/44; H01Q 5/392; H01Q 1/36; H01Q 1/22; H01Q 1/2258; H01Q 1/242; H01Q 1/38; H01Q 1/50; H01Q 5/10; H01Q 5/307; H01Q 5/314; H01Q 1/46; H01Q 1/00; H04M 1/0274; H04M 1/0249; H04M 1/0277

See application file for complete search history.

(56) References Cited

U.S. PATENT DOCUMENTS

| | | |
|---|---|---|
| 2010/0039329 A1 | 2/2010 | Chen et al. |
| 2012/0274538 A1 | 11/2012 | Tsou et al. |

(Continued)

FOREIGN PATENT DOCUMENTS

| | | |
|---|---|---|
| CN | 102956953 A | 3/2013 |
| CN | 103296385 A | 9/2013 |

(Continued)

OTHER PUBLICATIONS

Intellectual property India, Office Action Issued in Application No. 201947047177, dated Dec. 6, 2021, (5p).

(Continued)

*Primary Examiner* — Hai V Tran
*Assistant Examiner* — Bamidele A Immanuel
(74) *Attorney, Agent, or Firm* — Arch & Lake LLP

(57) ABSTRACT

A mobile terminal and an antenna radiation method of the mobile terminal are provided. The mobile terminal includes a frame employed as an antenna, the frame having a feed point; an antenna bracket positioned within the frame; a first metal sheet positioned on the antenna bracket, and coupled to the feed point; and a second metal sheet positioned on the antenna bracket, a gap being positioned between the second metal sheet and the first metal sheet, the second metal sheet being coupled to the first metal sheet via the gap for feeding.

18 Claims, 3 Drawing Sheets

(56) References Cited

U.S. PATENT DOCUMENTS

| | | | | |
|---|---|---|---|---|
| 2013/0214986 | A1* | 8/2013 | Zhu | H01Q 1/243 |
| | | | | 343/866 |
| 2014/0327584 | A1* | 11/2014 | Chang | H01Q 5/378 |
| | | | | 343/702 |
| 2015/0155616 | A1* | 6/2015 | Lin | H01Q 9/42 |
| | | | | 343/702 |
| 2015/0372372 | A1* | 12/2015 | Lee | H01Q 1/243 |
| | | | | 343/702 |
| 2016/0064820 | A1* | 3/2016 | Kim | H01Q 1/243 |
| | | | | 343/767 |
| 2016/0254832 | A1* | 9/2016 | Yoo | H01Q 13/10 |
| | | | | 455/575.5 |
| 2016/0329628 | A1* | 11/2016 | Kim | H01Q 1/38 |
| 2016/0336644 | A1* | 11/2016 | Lee | H01Q 5/357 |
| 2016/0351998 | A1* | 12/2016 | Ahn | H01Q 1/42 |
| 2017/0048363 | A1* | 2/2017 | Lee | H01Q 5/314 |
| 2017/0230073 | A1* | 8/2017 | Youn | H04B 1/3888 |
| 2017/0294709 | A1* | 10/2017 | Xue | H01Q 5/364 |
| 2017/0302771 | A1* | 10/2017 | Kim | H01Q 9/42 |
| 2018/0026333 | A1* | 1/2018 | Lee | H01Q 13/18 |
| | | | | 343/702 |
| 2018/0026346 | A1* | 1/2018 | Lee | H01Q 5/10 |
| | | | | 455/575.7 |
| 2018/0026348 | A1* | 1/2018 | Lee | H01Q 5/371 |
| | | | | 455/575.5 |
| 2018/0131092 | A1* | 5/2018 | Liou | H01Q 1/243 |
| 2018/0248264 | A1* | 8/2018 | Chen | H01Q 9/40 |
| 2018/0261907 | A1* | 9/2018 | Ha | H01Q 13/10 |
| 2018/0375196 | A1* | 12/2018 | Han | H01Q 1/243 |
| 2019/0067796 | A1* | 2/2019 | Lu | H01Q 1/243 |
| 2019/0067797 | A1* | 2/2019 | Jung | H04M 1/026 |
| 2019/0097308 | A1* | 3/2019 | Chen | H01Q 1/243 |
| 2019/0305431 | A1* | 10/2019 | Islam | H01Q 1/243 |
| 2019/0312333 | A1* | 10/2019 | Kim | H01Q 9/42 |
| 2019/0372223 | A1* | 12/2019 | Hsu | H01Q 1/241 |
| 2020/0373669 | A1* | 11/2020 | Xue | H01Q 1/243 |

FOREIGN PATENT DOCUMENTS

| | | |
|---|---|---|
| CN | 104300215 A | 1/2015 |
| CN | 204441470 U | 7/2015 |
| CN | 204668452 U | 9/2015 |
| CN | 105609956 A | 5/2016 |
| CN | 105609956 A | 5/2016 |
| CN | 106207440 A | 12/2016 |
| CN | 205828653 U | 12/2016 |
| CN | 107258034 A | 10/2017 |
| CN | 107331964 A | 11/2017 |
| CN | 107359401 A | 11/2017 |
| CN | 107681251 A | 2/2018 |
| CN | 107681272 A | 2/2018 |
| CN | 107834206 A | 3/2018 |
| CN | 108155474 A | 6/2018 |
| CN | 108565544 A | 9/2018 |
| CN | 109244645 A | 1/2019 |
| CN | 109560364 A | 4/2019 |
| EP | 3229316 A1 | 10/2017 |
| JP | 2009253872 A | 10/2009 |
| JP | 2019009760 A | 1/2019 |
| KR | 20180031424 A | 3/2018 |
| KR | 20190040331 A | 4/2019 |
| TW | 201244252 A | 11/2012 |

OTHER PUBLICATIONS

Office Action of the Japanese application No. 2019-564107, dated Feb. 8, 2022 with English translation, (12p).
First Office Action issued to Korean Patent Application No. 10-2019-7031314 dated Jul. 11, 2020 with English translation, (10p).
Extended European Search Report issued to EP Application No. 19213553.1 dated May 28, 2020, (10p).
Office Action issued to Japanese Application No. 2019-564107 dated Aug. 24, 2021 with English translation, (14p).
Second Office Action issued to Chinese Application No. 201910343400.5 dated Sep. 3, 2021 with English translation, (13p).
International Search Report issued to PCT/CN2019/098299 dated Jan. 19, 2020 with English translation, (20p).
First Chinese Office Action issued in CN201910343400.5, dated Apr. 6, 2021, 12 pages.

* cited by examiner

MOBILE TERMINAL AND ANTENNA RADIATION METHOD OF MOBILE TERMINAL

CROSS-REFERENCE TO RELATED APPLICATION

This application is based upon and claims priority to Chinese Patent Application No. 201910343400.5, filed on Apr. 26, 2019, the entire contents of which are incorporated herein by reference.

TECHNICAL FIELD

The present disclosure relates to the field of wireless communication technologies, and more particularly to a mobile terminal, and an antenna radiation method of the mobile terminal.

BACKGROUND

Terminals may be divided into fixed terminals and mobile terminals usually based on their mobility. A conventional mobile terminal is a telephone, a tablet or the like. The mobile terminal may implement wireless communication, which is more convenient than the fixed terminal.

An antenna is an essential structure for the wireless communication. Wireless communication technologies have developed from the first generation of communication technology (1G) to the fourth generation of communication technology (4G), and the antenna of the mobile terminals becomes smaller and smaller. Presently, a metal frame of the mobile terminal may be employed as the antenna. A current mobile terminal usually has a plurality of antennas, to support a plurality of frequency bands, such as 2G, 3G and 4G.

SUMMARY

In a first aspect of the present disclosure provide a mobile terminal. The method includes: a frame having a feed point, and configured to define an internal space of the mobile terminal; a first metal sheet positioned within the internal space, and coupled to the feed point; and a second metal sheet positioned within the internal space, a gap being positioned between the second metal sheet and the first metal sheet, the second metal sheet being coupled to the first metal sheet via the gap for feeding.

In another aspect of the present disclosure also provide an antenna method of the mobile terminal. The mobile terminal is any terminal described above. The method includes: providing by the mobile terminal an electrical signal to the feed point; receiving by the frame the electrical signal, such that the frame at least forms a resonance of a first frequency band, to radiate an electromagnetic wave; and receiving by the first metal sheet the electrical signal, to stimulate the electrical signal to the second metal sheet, such that the second metal sheet forms a resonance of a second frequency band, to radiate an electromagnetic wave.

BRIEF DESCRIPTION OF THE DRAWINGS

In order to illustrate the examples of the present disclosure more clearly, introduction will be made briefly below to the accompanying drawings needing to be used in examples. Obviously, the accompanying drawings described below are merely some examples of the present disclosure. The skilled in the art may also obtain other accompanying drawings according to these accompanying drawings without any creative works.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

The terminology used in the present disclosure is for the purpose of describing particular examples only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
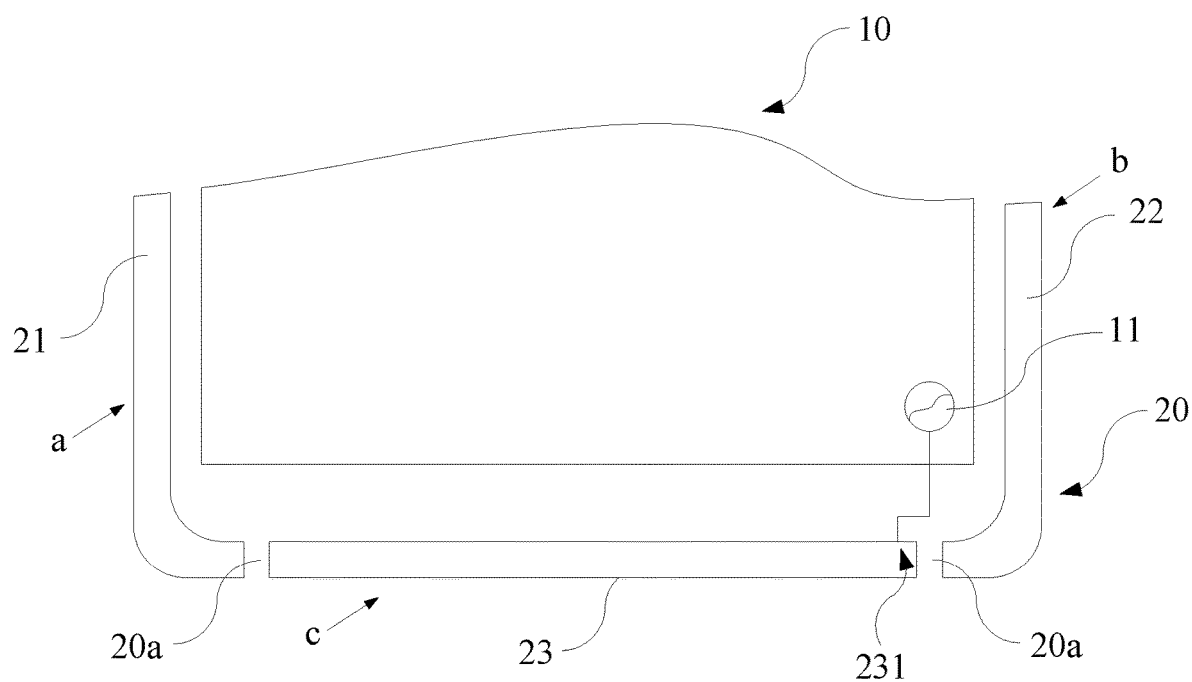
FIG. 1 is a schematic diagram illustrating a local structure of a mobile terminal in the related art, according to an example of the present disclosure.

FIG. 1 is a schematic diagram illustrating a local structure of a mobile terminal. As illustrated in FIG. 1, the mobile terminal may include a terminal body 10 and a frame 20. The frame 20 is made of metal. The frame 20 outlines the outer border of an internal space of the mobile terminal. The internal space being within the internal space of the mobile terminal and being adjacent to the frame 20, which is the outer border of the mobile terminal.

The terminal body 10 is positioned within the frame 20. The frame 20 forms an appearance of the side surface of the mobile terminal. Taking a telephone as an example, the telephone usually has a front side for display and a rear side opposite the front side. The front side and the rear side are connected by the side surface. The side surface includes a first surface 'a' and a second surface 'b,' which are opposite, and a third surface 'c' coupled to the first surface 'a' and the second surface 'b.' The third surface 'c' may be connected to the first surface 'a' and the second surface 'b' by arc transition. The frame 20 may have slits 20a. For example, the frame 20 in FIG. 1 has two slits 20a. The two slits 20a divide the frame 20 into a first conductive section 21, a second conductive section 22, and a third conductive section 23, which are mutually independent. The first conductive section 21 is positioned on the first surface. The second conductive section 22 is positioned on the second surface. The third conductive section 23 is positioned on the third surface. The third conductive section 23 has a feed point 231, and the feed point 231 may be coupled to a feed source 11 electrically to output an electronic signal to the feed point 231.

The third conductive section 23 may be taken as a low-frequency radiator. The low-frequency radiator is equivalent to a low-frequency antenna, of which a frequency may be 700 MHz-960 MHz. The first conductive section 21 is coupled to the third conductive section 23 for feeding via one slit 20a. The first conductive section 21, and a portion of the third conductive section 23, which is positioned between the feed point 231 and the first conductive section 21, may be taken as a medium frequency radiator. The medium frequency radiator is equivalent to a medium frequency antenna, of which a frequency may be 1710 MHz-2170 MHz. The second conductive section 22 is coupled to the third conductive section 23 for feeding via the other slit 20a. The second conductive section 22, and a portion of the third conductive section 23, which is positioned between the feed point 231 and the second conductive section 22, may be taken as a high-frequency radiator. The high-frequency radiator is equivalent to a high-frequency antenna, of which a frequency is 2300 MHz-2700 MHz. In this way, the mobile terminal may support 2G, 3G, and 4G, and the antennas may be compact. With the appearance of 5G, mobile terminals need to add antennas in order to support 5G.

Figure 2:
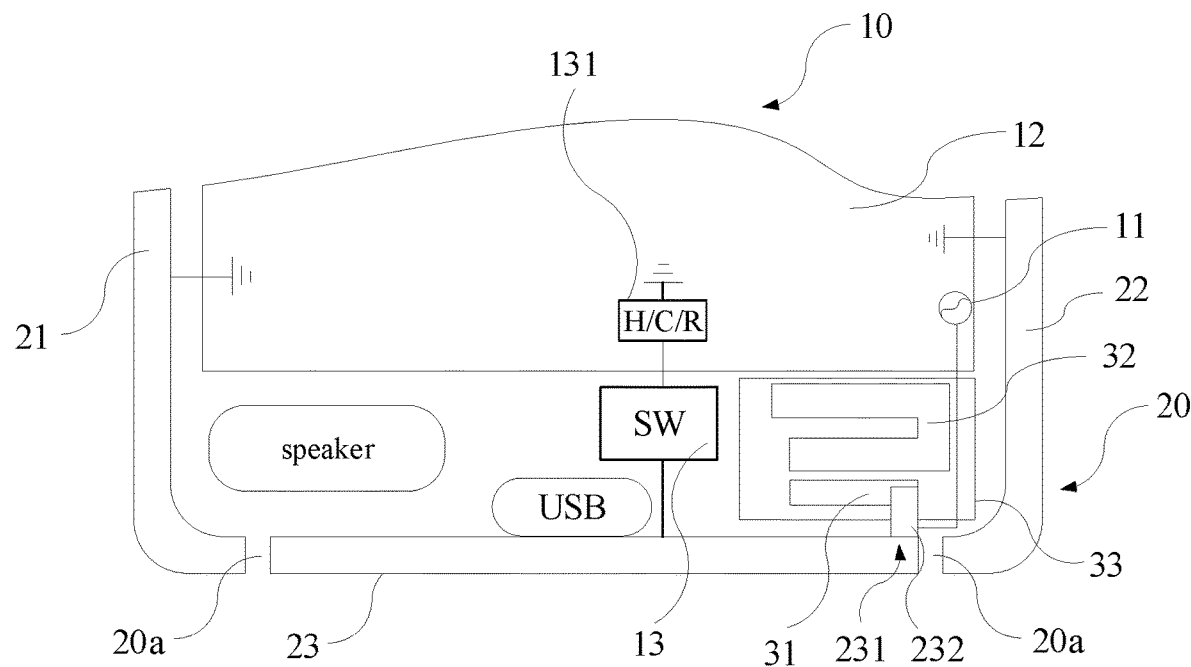
FIG. 2 is a schematic diagram illustrating a local structure of a mobile terminal, according to an example of the present disclosure.

FIG. 2 is a schematic diagram illustrating a local structure of a mobile terminal provided in an example of the present disclosure. The mobile terminal may include a telephone or a tablet. As illustrated in FIG. 2, the mobile terminal may include a frame 20, a first metal sheet 31, and a second metal sheet 32. The frame 20 is configured to define an interface space of the mobile terminal. The frame 20 has a feed point 231.

The first metal sheet 31 is positioned within the internal space and coupled to the feed point 231.

Figure 3:
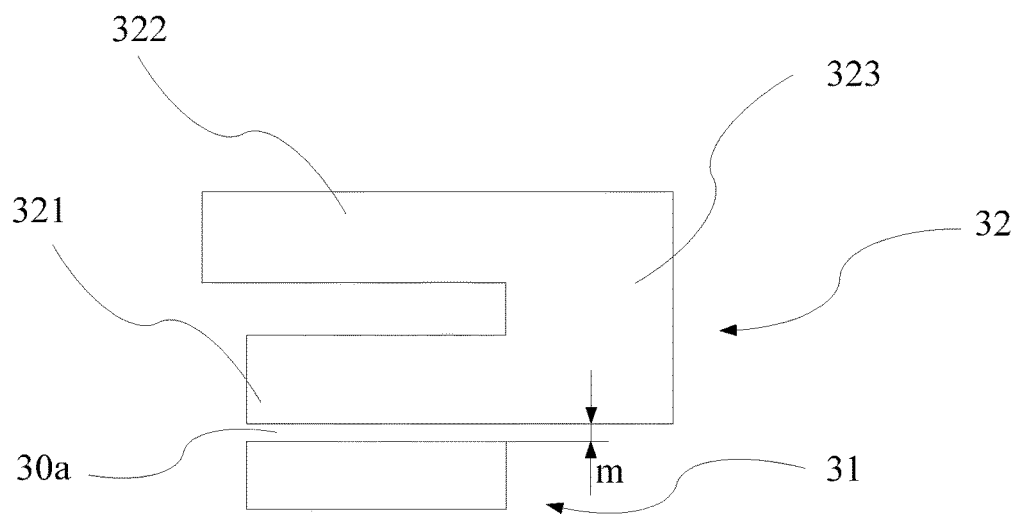
FIG. 3 is a schematic diagram illustrating a structure of a first metal sheet and a second metal sheet, according to an example of the present disclosure.

The second metal sheet 32 is positioned within the internal space. FIG. 3 is a schematic diagram illustrating a structure of a first metal sheet and a second metal sheet provided in an example of the present disclosure. As illustrated in FIG. 3, there is a gap 30a between the second metal sheet 32 and the first metal sheet 31, and the second metal sheet 32 is coupled to the first metal sheet 31 for feeding via the gap 30a.

By providing the first metal sheet and the second metal sheet, coupling the first metal sheet to the feed point in the frame, providing the gap between the second metal sheet and the first metal sheet, and coupling the second metal sheet to the first metal sheet for feeding via the gap, the second metal sheet may radiate electromagnetic waves, and the manner of coupled feeding may stabilize the radiation capability of the second metal sheet, such that the mobile terminal may support more frequency bands.

In addition, the frame employed as the antenna and the first metal sheet are coupled to the same feed point, and the frame and the first metal sheet may share the same feed source, such that the mobile terminal may have the compact structure, and it is convenient to reduce a volume of the mobile terminal.

As illustrated in FIG. 2, the mobile terminal may also include an antenna bracket 33. The antenna bracket 33 is positioned within the internal space. The first metal sheet 31 and the second metal sheet 32 may be positioned on the antenna bracket 33, to facilitate installation of the first metal sheet 31 and the second metal sheet 32.

For example, the first metal sheet 31 and the second metal sheet 32 are formed on the antenna bracket 33 by employing a laser direct structuring (LDS) technique. By employing the laser direct structuring technique to produce the first metal sheet 31 and the second metal sheet 32, production accuracy is high, and it is convenient to produce shapes and sizes of the first metal sheet 31 and the second metal sheet 32 accurately.

In addition, a flexible printed circuit (FPC) may also be provided on the antenna bracket 33. The first metal sheet 31 and the second metal sheet 32 may be positioned in the FPC. Alternatively, the first metal sheet 31 and the second metal sheet 32 may also be installed on the antenna bracket 33 by employing a bonding way, for example, by an adhesive, or by bonding the first metal sheet 31 and the second metal sheet 32 to a portion of the antenna bracket 33 after the portion of the antenna bracket 33 is heated and melted. The first metal sheet 31 and the second metal sheet 32 may include copper sheets or steel sheets.

As illustrated in FIG. 3, the second metal sheet 32 may include a first branch 321, a second branch 322, and a connection part 323. The first branch 321 and the second branch 322 are arranged on the same side of the connection part 323 in parallel and at intervals. Both an end of the first branch 321 and an end of the second branch 322 are coupled to the connection part 323. The gap 30a is positioned between the first metal sheet 31 and the first branch 321. The second metal sheet 32 is taken as a radiator. The sizes of the first branch 321 and the second branch 322 and a distance between the first branch 321 and the second branch 322 may affect a frequency covered by the second metal sheet 32. Since 5G has a plurality of frequency bands, such as 3.3 GHz~3.6 GHz, and 4.8 GHz~5.0 GHz, and different operators may employ different frequency bands, the frequency covered by the second metal sheet 32 may be changed by changing the sizes of the first branch 321 and the second branch 322 and the distance between the first branch 321 and the second branch 322, such that the frequency covered by the second metal sheet 32 may be applied to different operators.

Figure 4:
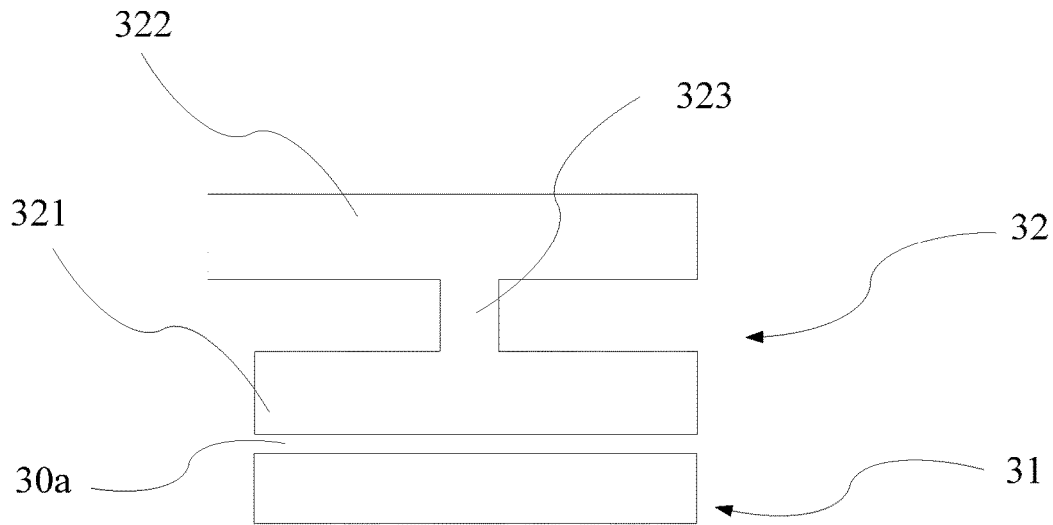
FIG. 4 is a schematic diagram illustrating a structure of a first metal sheet and a second metal sheet, according to an example of the present disclosure.

FIG. 4 is a schematic diagram illustrating a structure of a first metal sheet and a second metal sheet provided in another example of the present disclosure. The second metal sheet illustrated in FIG. 4 is different from the second metal sheet illustrated in FIG. 3 in a position of the connection part 323. As illustrated in FIG. 4, the first branch 321 and the second branch 322 are positioned in parallel and at intervals. The connection part 323 is coupled to a middle of the first branch 321 and a middle of the second branch 322. The gap 30a is positioned between the first metal sheet 31 and the first branch 321. The position of the connection part 323 between the first branch 321 and the second branch 322 may be provided based on requirements, to keep clear of structures within the mobile terminal, to increase distances between the second metal sheet 32 and metal structures in the mobile terminal as much as possible, and to prevent the metal structures affecting operation of the second metal sheet 32.

For example, as illustrated in FIG. 3, the first metal sheet 31 has a rectangular shape. However, the shape of the first metal sheet 31 may be adaptively modified based on a size of the internal space of the mobile terminal and a structure of the bracket, which is not limited by the present disclosure.

One side of the first metal sheet 31 may be parallel to one side of the second metal sheet 32. The gap 30a may influence the coupling between the first metal sheet 31 and the second metal sheet 32. The coupling between the first metal sheet 31 and the second metal sheet 32 may be varied with the width of the gap 30a. One side of the first metal sheet 31 is parallel to one side of the second metal sheet 32, such that the gap 30a between the first metal sheet 31 and the second metal sheet 32 is equal in size everywhere, and it is easy to adjust the size of the gap 30a.

The antennas usually need to be simulated during design. All the lengths and widths of the first branch 321 and the second branch 322, and the distance between the first branch 321 and the second branch 322 may be determined by simulation. The width m of the gap 30a may include the coupling between the first metal sheet 31 and the second metal sheet 32. The width m of the gap 30a may be provided to be small, such that the coupling between the first metal sheet 31 and the second metal sheet 32 is better, and the energy loss may be reduced. The width m of the gap 30a may also be determined by simulation.

In a possible implementation of examples of the present disclosure, the antenna bracket 33 may be a plastic structural component, which may be molded by injection molding; thus, it is easy to manufacture, and beneficial for reducing a weight of the mobile terminal because of the light.

The antenna bracket 33 and the frame 20 may be in contact or at intervals. The antenna bracket 33 may be in a shape of a plate. The antenna bracket 33 may also be configured to fix other structures inside the mobile terminal. For example, the antenna bracket 33 may also be configured to install structures such as a flexible circuit board, a printed circuit board, a speaker and the like. The flexible circuit board may be bonded to the antenna bracket 33. The printed circuit board may be fixed in the antenna bracket though a screw. The size of the antenna bracket 33 illustrated in FIG. 2 is merely an example. The size of the antenna bracket 33 may be provided according to the internal space in the mobile terminal. For example, the antenna bracket 33 in FIG. 2 may also extend to left to the border. In this way, the antenna bracket 33 may also be configured to install the speaker.

The first metal sheet 31 may be coupled to the feed point 231 though a conductive connection. For example, an elastic plate 232 may be provided at the feed point 231 on frame 20. The elastic plate is a conductor. Both the frame 20 and the first metal sheet 31 are in contact with the elastic plate 232. The elastic plate 232 may be kept in contact with the first metal sheet 31 by utilizing an elastic force of the elastic plate 232.

In a possible implementation of examples of the present disclosure, the elastic plate 232 may also be coupled to the first metal sheet 31 by the screw, such that the elastic plate 232 is kept in contact with the first metal sheet 31. The elastic plate 232 may be welded to the frame 20 or may be screwed to the frame 20. A minimum distance between the first metal sheet 31 and the feed point 231 may be provided smaller, to enable the radiation capability of the second metal sheet 32 more stable. A detailed value of the minimum distance may be determined by simulation.

As illustrated in FIG. 2, the frame 20 may include the first conductive section 21 and the second conductive section 22 which are positioned at intervals, and the third conductive section 23 between the first conductive section 21 and the second conductive section 22. The feed point 231 is positioned on the third conductive section 23. Slits 20a are arranged between the third conductive section 23 and the first conductive section 21 and between the third conductive section 23 and the second conductive section. The first conductive section 21 and the second conductive section 22 are coupled with the third conductive section 23 for feeding through the corresponding slits 20a. The frame 20 is provided with the first conductive section 21, the second conductive section 22 and the second conductive section 23. The feed point 231 is positioned on the third conductive section 23, such that the third conductive section 23 may be taken as the low-frequency radiator, which is equivalent to the low-frequency antenna. The first conductive section 21 is coupled to the third conductive section 23 for feeding via the slit 20a positioned between the first conductive section 21 and the third conductive section 23. The first conductive section 21, and the portion of the third conductive section 23, which is positioned between the feed point 231 and the first conductive section 21, may be taken as the medium frequency radiator, which is equivalent to the medium frequency antenna. The second conductive section 22 is coupled to the third conductive section 23 for feeding via the slit 20a positioned between the second conductive section 22 and the third conductive section 23. The second conductive section 22, and the portion of the third conductive section 23, which is positioned between the feed point 231 and the second conductive section 22, may be taken as the high-frequency radiator, which is equivalent to the high-frequency antenna. In this way, the frame 20 may be used as the antenna, and cover three frequency bands. For example, the low-frequency radiator may cover a frequency range with 700 MHz~960 MHz, the medium frequency radiator may cover a frequency range with 1710 MHz~2170 MHz, and the high-frequency radiator may cover a frequency range with 2300 MHz~2700 MHz. The second metal sheet 32 is coupled to the first metal sheet 31 for feeding via the gap 31. The second metal sheet 32 is also equivalent to a radiator. This radiator may cover a higher frequency range, such as 3.3 GHz~3.6 GHz or 4.8 GHz~5.0 GHz. When the feed point 231 outputs a radiation signal, the portion of the third conductive section 23, which is positioned between the feed point 231 and the first conductive section 21, and the first conductive section 21 are configured to radiate a signal with 1710 MHz-2170 MHz; the portion of the third conductive section 23, which is positioned between the feed point 231 and the second conductive section 22, and the second conductive section 22 are configured to radiate a signal with 2300 MHz-2700 MHz; the third conductive section 23 is configured to radiate a signal with 700 MHz-960 MHz; and the first metal sheet 31 and the second metal sheet 32 are configured to radiate a signal with 3.3 GHz~3.6 GHz or 4.8 GHz~5.0 GHz. In this way, the mobile terminal may support 2G, 3G, 4G, and 5G. Moreover, the first conductive section 21, the second conductive section 22, the third conductive section 23 and the second metal sheet 32 share the same source 11, such that the antenna may have a more compact structure, and it is beneficial to reduce the volume of the mobile terminal. The mobile terminal also includes a metal plate 12 employed as a ground. The first conductive section 21 and the second conductive section 22 may be coupled to the metal plate 12.

As illustrated in FIG. 2, the first metal sheet 31 may be positioned between the second metal sheet 32 and the third conductive section 23, which may facilitate to arrange the first metal sheet 31 adjacent to the feed point 231, and facilitate to couple the first metal sheet 31 to the feed point 231.

A length direction of the first metal sheet 31 may be the same as an extending direction of the third conductive section 23, that is, the first metal sheet 31 and the third conductive section 23 may be arranged in parallel. In the telephone, the third conductive section 23 is usually provided to extend a width direction of the telephone. In this way, the arrangement of the first metal sheet 31 may reduce the sizes of the first metal sheet 31 and the second metal sheet 32 in the length direction of the telephone, and space is saved.

In a possible implementation of examples of the present disclosure, the length direction of the first metal sheet 31 may also be at a non-zero angle with the extending direction of the third conductive section 23, such as 90°.

Taking that the mobile terminal is a telephone as an example, the third conductive section 23 may be a section positioned at a speaker or at a universal serial bus (USB) interface on the frame 20. The third conductive section 23 may have an opening configured to keep clear of a USB connection.

As illustrated in FIG. 2, the mobile terminal may also include a selector switch 13 and at least two tuning circuits 131. The selector switch 13 is configured to couple the third conductive section 23 to one tuning circuit 131 selectively. The third conductive section 23 may be coupled to different tuning circuits 131 through the selector switch 13, such that a signal with a specific frequency may be selected from received signals having a large frequency range. Since the communication service producers in different countries use signals with different frequency bands, the selector switch 13 may be used to couple different tuning circuits 131 selectively to change a resonance frequency band, such that one mobile terminal may use the communication service from different regions or different communication service providers.

The tuning circuit 131 may include at least one of an inductor H, a capacitor C and a resistor R. The tuning circuit 131 may be coupled to the ground. The tuning circuit 131 may be coupled to the metal plate 12 to achieve grounding.

As illustrated in FIG. 2, the feed point 231 may be positioned at an end of the third conductive section 23, which is closest to the second conductive section 22. When the selector switch 13 couples the third conductive section 23 to different tuning circuits, all the radiation capabilities of the first conductive section 21, the second conductive section 22, the third conductive section 23 and the second metal sheet 32 may be affected to some extent. However, since the feed point 231 is positioned at the end of the third conductive section 23, which is closest to the second conductive section 22, the distance between the second conductive section 22 and the feed point 231 is small, and the first metal sheet 31 is provided adjacent to the feed point 231, which may reduce the influence on the radiation capabilities of the second metal sheet 32 and the second conductive section 22. Further, the second metal sheet 32 and the first metal sheet 31, the second conductive section 22 and the third conductive section 23 are both fed by coupling, which may further reduce the influence on the radiation capabilities of the second metal sheet 32 and the second conductive section 22.

The second conductive section 22 and the portion of the third conductive section 23, which is positioned between the feed point 231 and the second conductive section 22, are equivalent to the high-frequency antenna. The second metal sheet 32 is also equivalent to a radiator. If the high-frequency antenna covers the frequency range with 2300 MHz~2700 MHz, the second metal sheet 32 covers the frequency range with 3.3 GHz~3.6 GHz or 4.8 GHz~5.0 GHz, and the mobile terminal may support 4G and 5G. When the selector switch 13 couples the third conductive section 23 to different tuning circuits, all the radiation capabilities of the first conductive section 21, the second conductive section 22, the third conductive section 23 and the second metal sheet may be affected to some extent. However, since the radiation capabilities of the second metal sheet 32 and the second conductive section 22 are less affected, the mobile terminal may ensure stable operation of the 4G signal and the 5G signal regardless of how the switch 13 is coupled.

Figure 5:
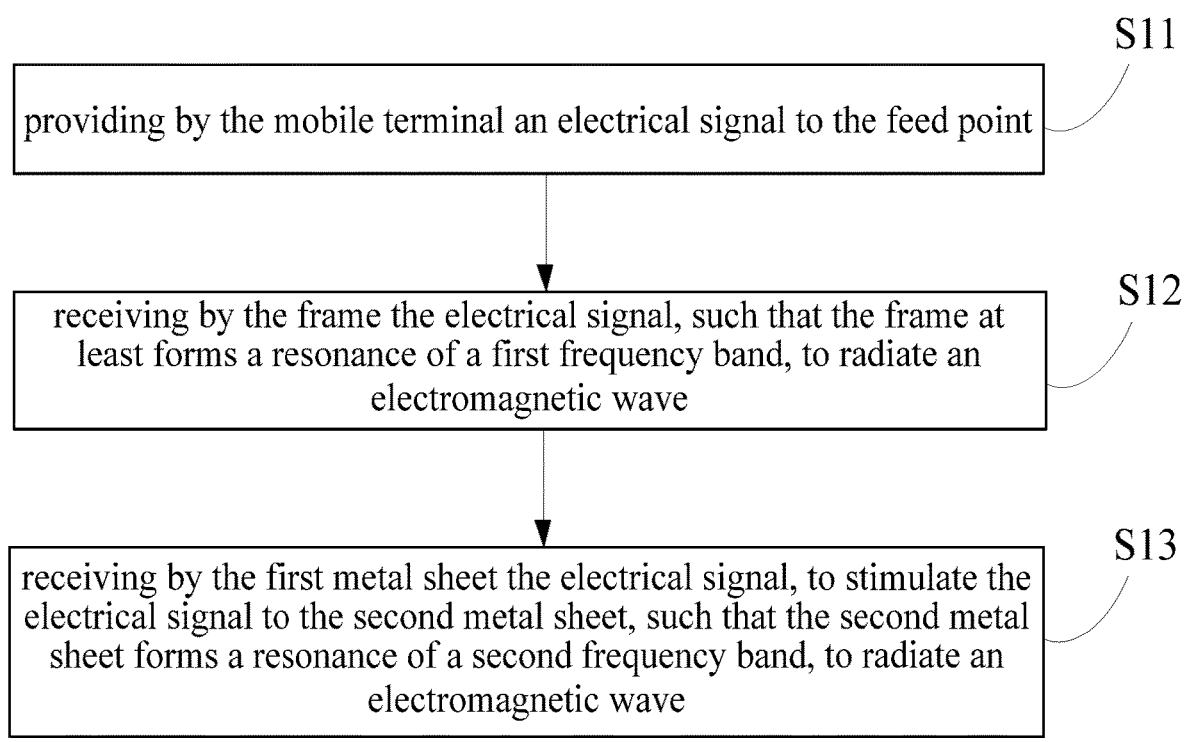
FIG. 5 is a flow chart illustrating an antenna radiation method of a mobile terminal, according to an example of the present disclosure.

FIG. 5 is a flow chart illustrating an antenna radiation method of a mobile terminal provided in an example of the present disclosure. The mobile terminal is any terminal illustrated in FIGS. 2-4. As illustrated in FIG. 5, the method includes acts in the following blocks.

At block S11, the mobile terminal provides an electrical signal to the feed point.

At block S12, the frame receives the electrical signal, such that the frame at least forms a resonance of a first frequency band, to radiate an electromagnetic wave.

At block S13, the first metal sheet receives the electrical signal, to stimulate the electrical signal to the second metal sheet, such that the second metal sheet forms a resonance of a second frequency band, to radiate an electromagnetic wave.

By providing the first metal sheet and the second metal sheet, coupling the first metal sheet to the feed point in the frame, proving the gap between the second metal sheet and the first metal sheet, and coupling the second metal sheet to the first metal sheet for feeding via the gap, the second metal sheet may radiate electromagnetic waves, and the manner of coupled feeding may stabilize the radiation capability of the second metal sheet, such that the mobile terminal may support more frequency bands.

Step S13 and step S12 may be performed simultaneously.

In a possible implementation of examples of the present disclosure, the second frequency band may be 3.3 GHz~3.6 GHz or 4.8 GHz~5.0 GHz, such that the mobile terminal may support 5G.

The first frequency band may be any of 700 MHz~960 MHz, 1710 MHz~2170 MHz or 2300 MHz~2700 MHz. For example, the first frequency band may be 700 MHz~960 MHz.

As illustrated in FIG. 2, the frame 20 may include the first conductive section 21, the second conductive section 22, and the third conductive section 23 which is positioned between the first conductive section 21 and the second conductive section 22. The description of the frame 20 may be seen in the previous section for details. For example, the third conductive section may form the resonance of the first frequency band under the action of the electrical signal. The first conductive section 21 and the portion of the third conductive section 23 which is positioned between the feed point 231 and the first conductive section 21 may form a resonance of a third frequency band under the action of the electrical signal. The second conductive section 22 and the portion of the third conductive section 23, which is positioned between the feed point 231 and the second conductive section 22 may form a resonance of a fourth frequency band under the action of the electrical signal. The third frequency band and the fourth frequency band may be any one of 700 MHz~960 MHz, 1710 MHz~2170 MHz or 2300 MHz~2700 MHz, which are different from the first frequency band. For example, the first frequency band may be 700 MHz~960 MHz, the third frequency band may be 1710 MHz~2170 MHz, and the fourth frequency band may be 2300 MHz~2700 MHz.

Other implementations of the present disclosure will be apparent to the skilled in the art after considering the specifications and practicing the application disclosed here. This application is therefore intended to cover any variations, uses, or adaptations of the present disclosure. These variations, uses, or adaptations follow the general principles of the present disclosure and include common general knowledge or conventional technical means in the art that are not disclosed in the present disclosure. The specification and embodiments are considered examples only. The true scope and spirit of the present disclosure should be indicated by the appended claims.

It should be understood that the present disclosure is not limited to accuracy structures described above and illustrated in the accompanying drawings, and may perform various modifications and changes without departing from the scope of the present disclosure. The scope of the present disclosure is merely limited by the appended claims.

What is claimed is:

1. A mobile terminal, comprising:
   a frame having a feed point, wherein the frame defines an outer border of an internal space of the mobile terminal;
   a first metal sheet positioned within the internal space, wherein the first metal sheet is coupled to the feed point; and
   a second metal sheet positioned within the internal space, wherein a gap is positioned between the second metal sheet and the first metal sheet, wherein the second metal sheet is coupled to the first metal sheet via the gap,
   wherein the second metal sheet comprises a first branch, a second branch, and a connection part, wherein the first branch and the second branch are arranged in parallel and at intervals, wherein the connection part is coupled to a middle of the first branch and a middle of the second branch, wherein the gap is positioned between the first metal sheet and the first branch.

2. The mobile terminal of claim 1, further comprising:
   an antenna bracket, wherein the antenna bracket is positioned within the internal space, wherein the first metal sheet and the second metal sheet are formed on the antenna bracket by employing a laser direct structuring technique.

3. The mobile terminal of claim 2, wherein the antenna bracket and the frame is in contact or at intervals.

4. The mobile terminal of claim 1, wherein when the feed point outputs a radiation signal:
   a portion of the third conductive section, which is positioned between the feed point and the first conductive section, and the first conductive section radiate a signal with 1710 MHz to 2170 MHz;
   a portion of the third conductive section, which is positioned between the feed point and the second conductive section, and the second conductive section radiate a signal with 2300 MHz to 2700 MHz;
   the third conductive section radiates a signal with 700 MHz to 960 MHz; and
   the first metal sheet and the second metal sheet radiate a signal with 3.3 GHz to 3.6 GHz or 4.8 GHz to 5.0 GHz.

5. The mobile terminal of claim 1, wherein the first metal sheet is positioned between the second metal sheet and the third conductive section.

6. The mobile terminal of claim 1, wherein the feed point is positioned in an end of the third conductive section, which is closest to the second conductive section.

7. The mobile terminal of claim 1, wherein a length direction of the first metal sheet is the same as an extending direction of the third conductive section.

8. The mobile terminal of claim 1, wherein a length direction of the first metal sheet is at a non-zero angle with an extending direction of the third conductive section.

9. The mobile terminal of claim 1, wherein the third conductive section is a section positioned at least one of a speaker or at a universal serial bus (USB) interface on the frame 20, wherein the third conductive section provides an opening configured to keep clear of the USB interface when the third conductive section is the section positioned at the USB interface.

10. The mobile terminal of claim 1, further comprising:
    a selector switch; and
    a plurality of tuning circuits, wherein the selector switch couples the third conductive section to one of the plurality of tuning circuits.

11. The mobile terminal of claim 1, wherein one side of the first metal sheet is parallel to one side of the second metal sheet, wherein the gap between the first metal sheet and the second metal sheet is equal in size everywhere.

12. The mobile terminal of claim 1, wherein the first metal sheet is coupled to the feed point through a conductive connection.

13. The mobile terminal of claim 12, wherein an elastic plate is provided at the feed point on the frame, and the frame and the first metal sheet are in contact with the elastic plate.

14. The mobile terminal of claim 13, wherein the elastic plate is either:
    kept in contact with the first metal sheet by utilizing an elastic force of the elastic plate, or coupled to the first metal sheet by a screw.

15. The mobile terminal of claim 1, wherein the frame comprises a first conductive section and a second conductive section arranged at intervals, wherein the frame further comprises a third conductive section between the first conductive section and the second conductive section, wherein the feed point is electrically connected on the third conductive section, wherein slits are arranged between the third conductive section and the first conductive section and between the third conductive section and the second conductive section, wherein the first conductive section and the second conductive section are coupled with the third conductive section for feeding through corresponding slits.

16. An antenna radiation method of a mobile terminal, wherein the mobile terminal is a terminal comprising:
    a frame having a feed point, wherein the frame defines an outer border of an internal space of the mobile terminal;
    a first metal sheet positioned within the internal space, wherein the first metal sheet is coupled to the feed point; and
    a second metal sheet positioned within the internal space, wherein the second metal sheet and the first metal sheet have a gap positioned between them, wherein the second metal sheet is coupled to the first metal sheet via the gap;
    wherein the second metal sheet comprises a first branch, a second branch, and a connection part, wherein the first branch and the second branch are arranged in parallel and at intervals, wherein the connection part is coupled to a middle of the first branch and a middle of the second branch, wherein the gap is positioned between the first metal sheet and the first branch, and the method comprises:
providing by the mobile terminal an electrical signal to the feed point;
receiving by the frame the electrical signal, wherein the frame at least forms a resonance of a first frequency band, to radiate an electromagnetic wave; and
receiving by the first metal sheet the electrical signal, to stimulate the electrical signal to the second metal sheet, wherein the second metal sheet forms a resonance of a second frequency band, to radiate an electromagnetic wave.

17. The antenna radiation method of claim 16, wherein the second frequency band is between 3.3 GHz and 3.6 GHz or between 4.8 GHz and 5.0 GHz.

18. A non-transitory computer-readable storage medium having stored therein instructions that, when executed by a processor of a mobile terminal, causes the mobile terminal to perform an antenna radiation method of the mobile terminal, wherein the mobile terminal comprising: a frame having a feed point, wherein the frame defines an outer border of an internal space of the mobile terminal; a first metal sheet positioned within the internal space, wherein the first metal sheet is coupled to the feed point; and a second metal sheet positioned within the internal space, wherein a gap is positioned between the second metal sheet and the first metal sheet, wherein the second metal sheet is coupled to the first metal sheet via the gap; and wherein the second metal sheet comprises a first branch, a second branch, and a connection part, wherein the first branch and the second branch are arranged in parallel and at intervals, wherein the connection part is coupled to a middle of the first branch and a middle of the second branch, wherein the gap is positioned between the first metal sheet and the first branch, the method comprising:
providing by the mobile terminal an electrical signal to the feed point;
receiving by the frame the electrical signal, wherein the frame at least forms a resonance of a first frequency band, to radiate an electromagnetic wave; and
receiving by the first metal sheet the electrical signal, to stimulate the electrical signal to the second metal sheet, wherein the second metal sheet forms a resonance of a second frequency band, to radiate an electromagnetic wave.

* * * * *